United States Patent
Fujii

(10) Patent No.: US 11,941,388 B2
(45) Date of Patent: Mar. 26, 2024

(54) PROGRAM UPDATE METHOD AND UPDATE SYSTEM

(71) Applicant: TOYOTA JIDOSHA KABUSHIKI KAISHA, Toyota (JP)

(72) Inventor: Takanori Fujii, Toki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/362,144

(22) Filed: Jun. 29, 2021

(65) Prior Publication Data

US 2022/0075612 A1   Mar. 10, 2022

(30) Foreign Application Priority Data

Sep. 7, 2020 (JP) ................. 2020-149758

(51) Int. Cl.
*G06F 9/44* (2018.01)
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC ............... G06F 8/65; G06F 8/71; G06F 8/658
See application file for complete search history.

(56) References Cited

U.S. PATENT DOCUMENTS

| | | | |
|---|---|---|---|
| 2008/0140278 A1* | 6/2008 | Breed | G07C 5/008 701/1 |
| 2011/0066594 A1* | 3/2011 | Srivastava | G06F 16/1844 707/625 |
| 2015/0277942 A1* | 10/2015 | Rork | G06F 9/44505 701/31.4 |
| 2018/0018164 A1 | 1/2018 | Kurosawa et al. | |
| 2019/0138298 A1* | 5/2019 | Teraoka | G06F 9/445 |
| 2019/0155743 A1* | 5/2019 | Loreskar | G06F 21/575 |
| 2019/0265965 A1* | 8/2019 | Acharya | G06F 8/658 |
| 2021/0157575 A1 | 5/2021 | Ogawa et al. | |
| 2022/0123590 A1* | 4/2022 | Kim | H02J 50/40 |
| 2022/0222064 A1* | 7/2022 | Park | H02J 50/40 |

FOREIGN PATENT DOCUMENTS

| | | |
|---|---|---|
| JP | 2003-337723 A | 11/2003 |
| JP | 2004-199121 A | 7/2004 |
| JP | 2019-061690 A | 4/2019 |
| JP | 2020-027625 A | 2/2020 |
| WO | 2013/021423 A1 | 2/2013 |

* cited by examiner

*Primary Examiner* — Hang Pan

(74) *Attorney, Agent, or Firm* — Oblon, McClelland, Maier & Neustadt, L.L.P.

(57) ABSTRACT

An update system includes: a first server that stores a control program; a second server that stores a common program; a difference extraction device that generates difference data between the common program and the control program; and a reprograming tool that transmits the difference data to a vehicle equipped with an ECU to be updated. The difference extraction device searches a search range by a search unit to find whether search target data of the control program is included in the common program, and generates the difference data. The search range includes, for example, an address of the search target data in the control program and addresses rearward of that address. An offset area is provided in a head area of the common program.

7 Claims, 11 Drawing Sheets

PROGRAM UPDATE METHOD AND UPDATE SYSTEM

CROSS-REFERENCE TO RELATED APPLICATION

This application claims priority to Japanese Patent Application No. 2020-149758 filed on Sep. 7, 2020, incorporated herein by reference in its entirety.

BACKGROUND

1. Technical Field

The present disclosure relates to program update methods and update systems.

2. Description of Related Art

There is a known method in which when updating a program of a control device and the like, difference data between the update program and the base program (old file) is generated and sent to the control device to be updated, instead of sending all the data of the update program (new file) to the control device to be updated, for example. As a method for generating the difference data, for example, Japanese Unexamined Patent Application Publication No. 2003-337723 (JP 2003-337723 A) discloses a method for generating difference data by sequentially comparing data with an old file by a predetermined data unit (for example, by one byte) from the head of a new file (see JP 2003-337723 A).

SUMMARY

Here, searching for data to be searched (search target data) across the entire range of the old file may require a large amount of time for processing. To address this, a search range may be set in the old file. The search range may be set in the old file, focusing on the addresses rearward of the address on the new file of the search target data, for example. In this case, when addition of program is performed, for example, there can be data in the new file that is located further rearward than the address in the old file, due to the addition of the program to the address forward of that data. In other words, since such data is located, in the old file, further forward than the address in the new file, the data is excluded from the search target and is extracted as a difference. If there is a large number of such data, the volume of the difference data becomes large, and the time required for updating the program may increase.

The present disclosure has been made to solve the above issues, and an object of the present disclosure is to suppress an increase in volume of difference data in update of a program using the difference data.

A program update method according to the present disclosure is a program update method that transmits difference data between a first program and a second program from a first device to a second device and updates a control program implemented in the second device to the second program based on the difference data. The program update method includes: in the first device, a step of acquiring the first program; a step of acquiring the second program and searching a search range to find whether search target data divided into search units is included in the first program; a step of not extracting the search target data as a difference when the search target data is included in the first program but extracting the search target data as the difference to generate difference data when the search target data is not included in the first program; and a step of outputting the generated difference data to the second device. The search range is set, in the first program, so as to include more data located at addresses rearward of an address that is the same as an address of the search target data of the second program than data located at addresses forward of the address that is the same as the address of the search target data of the second program. An offset area that does not include data as a program is provided in a head area of the first program.

An update system according to the present disclosure is an update system that transmits difference data between a first program and a second program to a device to be updated and updates a control program implemented in the device to be updated to the second program based on the difference data. The update system includes: a first storage device that stores the first program; a second storage device that stores the second program; and a difference extraction device that generates the difference data and transmits the difference data to the device to be updated. The difference extraction device acquires the first program and the second program from the first storage device and the second storage device, respectively, searches a search range by a search unit to find whether search target data of the second program is included in the first program, and does not extract the search target data as a difference when the search target data is included in the first program, but extracts the search target data as the difference to generate difference data when the search target data is not included in the first program. The search range is set, in the first program, so as to include more data located at addresses rearward of an address that is the same as an address of the search target data of the second program than data located at addresses forward of the address that is the same as the address of the search target data of the second program. An offset area that does not include data as a program is provided in a head area of the first program.

According to the above configuration, the search range is set, in the first program, so as to include more data located at addresses rearward of an address that is the same as an address of the search target data of the second program than data located at addresses forward of the address that is the same as the address of the search target data of the second program. An offset area that does not include data as a program is provided in a head area of the first program. By providing the offset area, for example, even when a program is added and there is data whose address is changed due to the addition, it is possible to suppress the address of the data in the second program from being located further rearward than the address of the data in the first program. Therefore, the data can be included in the search range when the data is searched. Thus, it is possible to suppress the search target data from being extraction as a difference, and it is possible to suppress an increase in the volume of the difference data.

In an embodiment, the first program is a program implemented in the second device for updating the control program, and is a program that is not updated.

According to the above configuration, the first program, which is a program that is not updated, is used in the generation of the difference data. Therefore, it is possible to suppress the processing from becoming complicated.

In an embodiment, the control program is a first program. The first program is a program of a version immediately before the second program.

According to the above configuration, the difference data is the difference between the first program, which is the version immediately before the second program, and the second program. Accordingly, the difference data has the volume for one update. Thus, the volume of the difference data can be made relatively small.

In an embodiment, the first program is a program of a version immediately before the second program. When update from the first program to the second program includes addition of data, the data is added so as to reduce the offset area in the second program.

According to the above configuration, when data is added by the update of the program, the data is added so as to reduce the offset area in the second program. By adding the data so as to reduce the offset area, the addresses of the data located at the addresses rearward of the address at which the added data is to be located are not changed in the second program. Further, in the second program, the addresses of the data located at the addresses forward of the address at which the added data is to be located shifts forward. Accordingly, it is possible to suppress a phenomenon that due to the addition of the program, the address of the data in the first program is located further forward than the address of the corresponding data of the second program, in the corresponding data between the data in the first program and the data in the second program. Thus, even when the data is added by the update of the program, it is possible to suppress the search target data from being excluded from the search range.

In an embodiment, each of the first program and the second program is divided into divided data having a predetermined data size. A volume of the divided data is larger than the search units. The search range includes, in the first program, divided data located at an address that is the same as an address of divided data including the search target data of the second program and divided data located at addresses rearward of the divided data located at the address that is the same as the address of the divided data including the search target data of the second program.

According to the above configuration, the search range includes, in the first program, divided data located at an address that is the same as an address of divided data including the search target data of the second program and divided data located at addresses rearward of the divided data located at the address that is the same as the address of the divided data including the search target data of the second program. By providing the offset area in the head area of the first program, even when a program is added and there is data whose address is changed due to the addition, it is possible to suppress the address of the data in the second program from being located further rearward than the address of the data in the first program. Therefore, the search target data can be included in the search range. Thus, it is possible to suppress the search target data from being extraction as a difference, and it is possible to suppress an increase in the volume of the difference data.

In an embodiment, a volume of the offset area is set based on prediction of a potential design change to the program implemented in the second device.

According to the above configuration, the volume of the offset area is set based on the prediction of design changes that can be made to the program implemented in the second device. Therefore, it is possible to suppress an excessive offset area from being set.

According to the present disclosure, it is possible to suppress an increase in the volume of the difference data in the update of the program using the difference data.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
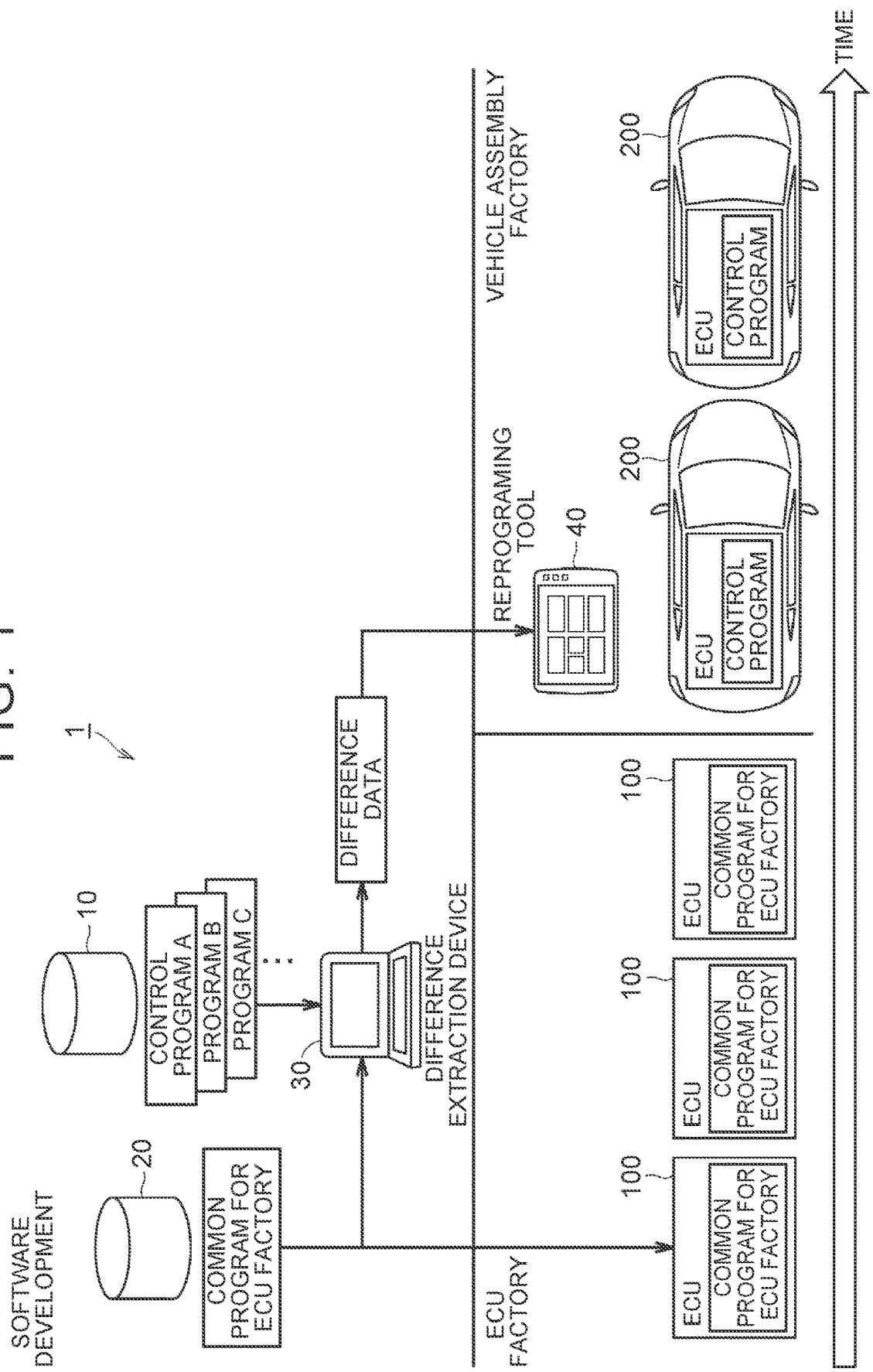
FIG. 1 is a diagram schematically showing an overall configuration of a software update system according to a first embodiment.

Hereinafter, embodiments of the present disclosure will be described in detail with reference to the drawings. The same or corresponding parts in the drawings are denoted by the same reference signs, and the description thereof will not be repeated.

First Embodiment

Overall Configuration of Software Update System

FIG. 1 is a diagram schematically showing an overall configuration of a software update system 1 according to a first embodiment. The software update system 1 is a system for updating a control program implemented in electronic control units (ECUs) 100 mounted on vehicles 200. The update of the control program in the first embodiment includes writing the control program to the ECU 100 at an initial stage.

The software update system 1 includes a first server 10, a second server 20, a difference extraction device 30, and a reprograming tool 40.

The first server 10 stores control programs for the ECU 100. The control programs are developed by, for example, developers who develop the control programs of the ECUs 100, and are stored in the first server 10. The control programs stored in the first server 10 are prepared for individual destinations (for example, Japan, Europe, North America, China, and the like) of the vehicles 200 on which the ECUs 100 are mounted (control programs A, B, C, and the like). In the present embodiment, for example, an example in which the control program for Japan (hereinafter, also simply referred to as "control program") is implemented in the vehicles 200 will be described.

Further, the first server 10 stores attribute information associated with the control program. The attribute information includes identification information for identifying an ECU in which the control program is to be implemented.

The second server 20 stores a common program commonly used by the ECUs 100 regardless of the destination of the vehicles 200. The common program is developed by, for example, developers who develop the common program of the ECUs 100, and is stored in the second server 20. The common program is developed based on, for example, one of the control programs A, B, C, and the like As shown in FIG. 1, the common program is written to the ECUs 100 at an ECU factory that manufactures the ECUs. For writing the common program to the ECU 100, for example, a writing tool (not shown) is used.

The ECUs 100 in which the common program is written at the ECU factory are transported to the vehicle assembly factory and mounted on the vehicles 200 at the vehicle assembly factory. Although the details will be described later, the control program is written to the ECUs 100 mounted on the vehicle 200 at the vehicle assembly factory.

The difference extraction device 30 extracts a difference between the common program and the control program and generates difference data. The difference extraction device 30 acquires the control program from the first server 10. The difference extraction device 30 acquires the common program from the second server 20. The difference extraction device 30 compares the common program and the control program and extracts the difference data. The difference extraction device 30 outputs the generated difference data to the reprograming tool 40. The details of the difference data generation method will be described later.

The difference extraction device 30 also acquires the attribute information from the first server 10 together with the control program. The difference extraction device 30 outputs the attribute information to the reprograming tool 40 together with the generated difference data.

The reprograming tool 40 is installed in, for example, the vehicle assembly factory. The reprograming tool 40 is configured to be able to communicate with the difference extraction device 30, and acquires the difference data and the attribute information from the difference extraction device 30. Further, the reprograming tool 40 is configured to be able to communicate with the vehicles 200. The communication between the reprograming tool 40 and the vehicles 200 may be wired communication or wireless communication.

When the reprograming tool 40 acquires the difference data and the attribute information from the difference extraction device 30, the reprograming tool 40 identifies the vehicle 200 equipped with the ECU 100 to which the control program is written based on the attribute information. Then, the reprograming tool 40 outputs the difference data to the specified vehicle 200.

When the vehicle 200 receives the difference data from the reprograming tool 40, the vehicle 200 outputs the received difference data to the ECU 100.

The ECU 100 includes a central processing unit (CPU), a memory, and an input/output port (none of which is shown). The memory includes a read only memory (ROM) and a random access memory (RAM). The ROM stores the control program executed by the CPU and the common program implemented at the ECU factory. The CPU expands the programs stored in the ROM into the RAM and executes the programs.

When the ECU 100 receives the difference data, the ECU 100 restores the control program using the difference data and the common program. When the control program is restored, the ECU 100 stores the restored control program in the memory (ROM).

Here, at the vehicle assembly factory, writing of the control program (or update of the control program) to the ECU 100 of the vehicle 200 is required to be completed within a tact time. For example, when the volume of the difference data is large, writing of the control program (or update of the control program) to the ECU 100 may not be completed within the tact time. Hereinafter, cases where the difference data becomes large will be specifically described.

Figure 2:
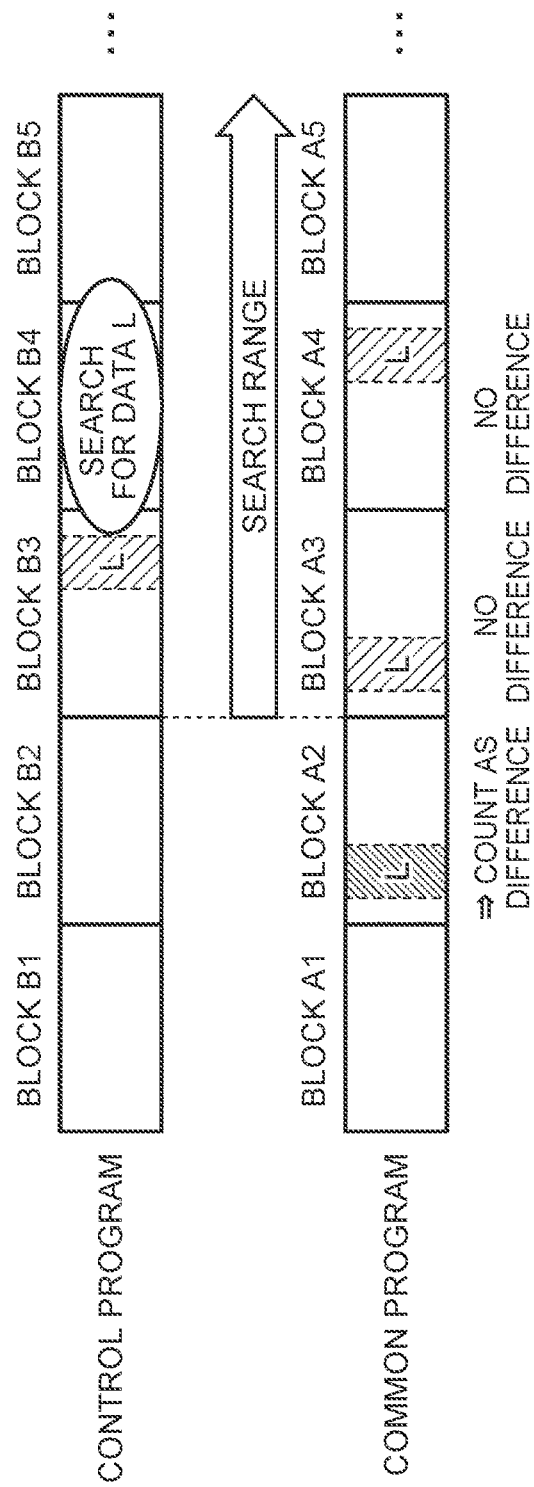
FIG. 2 is a diagram illustrating a method for difference extraction.

FIG. 2 is a diagram illustrating a method for difference extraction. First, the method for difference extraction will be described with reference to FIG. 2. As shown in FIG. 2, the common program is composed of divided data A1 to Ax (x: natural number) divided into blocks having a first predetermined data size. The common program (divided data A1 to Ax) are collectively read from the second server 20 to the difference extraction device 30. In the following, the divided data A1 to Ax divided into blocks having the first predetermined data size will also be referred to as "blocks A1 to Ax".

Further, the control program is also composed of divided data B1 to By (y: natural number) divided into blocks having the first predetermined data size, similarly to the common program. The control program is sequentially read from the first server 10 to the difference extraction device 30 in divided data units (in blocks), for example. In the following, the divided data B1 to By divided into blocks having the first predetermined data size will also be referred to as "blocks B1 to By".

The difference extraction device 30 compares the divided data B1 to By of the control program that are sequentially acquired with the divided data A1 to Ax of the common program that are collectively acquired, extracts the difference, and generates the difference data.

More specifically, the difference extraction device 30 performs a search on the divided data of the control program that are sequentially acquired, in a unit of a second predetermined data size, to find whether the data (search target data) is included in the common program. The second predetermined data size is a data size smaller than the data size of the blocks (first predetermined data size). The difference extraction device 30 recognizes data that cannot be detected as updated data (added or changed data) and extracts it as a difference. The difference extraction device 30 recognizes detected data as existing data and does not extract it as a difference.

For example, the difference extraction device 30 performs a search to find whether data L (second predetermined data size) of the block B3 of the control program shown in FIG. 2 is included in the common program (divided data A1 to Ax), and when there is no data that matches the data L, the data L is extracted as a difference.

Here, if the search target data (for example, data L) is detected from, for example, the entire range (divided data A1 to Ax) of the common program, it is possible to accurately find whether the search target data is existing data, but it takes a lot of time for processing and causes a delay in processing. Thus, the search range of the search target data is defined in order to extract the difference while appropriately balancing the search accuracy and the processing time. The search range is set such that, in the common program, the search range includes the block (any of A1 to Ax) corresponding to the address of the block of the control program (any of B1 to By) including the search target data and a predetermined number of blocks (three blocks) contiguous to the rear of the block, for example. The above predetermined number can be appropriately set from the viewpoint of search accuracy and processing time.

A specific example will be described. For example, in the case of searching for the data L of the block B3, in the common program, the search range is set to the block A3 that is a block corresponding to the address of the block B3 including the data L and the predetermined number of blocks contiguous to the rear of the block A3 (for example, blocks A4 to A6 when the predetermined number is three) (that is, the blocks A3 to A6 are set as the search range). In the case of searching for the data L, the data L is compared with each piece of data from data located at the head address of the block A3 to data at the final address of the block A6, for example. The search range is set focusing on the blocks rearward of the block (for example, block A3) corresponding to the address of the block (for example, block B3) including the search target data in this way, in order to facilitate the restoration of the control program in the ECU 100.

In the case where the search range is set as described above, when the block A3 or/and the block A4 include the data L in the common program, the data L is detected as the existing data because the block A3 and the block A4 are included in the search range. That is, the data L is not extracted as a difference.

However, in the common program, when the data L is not included in the blocks rearward of the block A3 and the data L is included in the block at the address forward of the block A3 (for example, the block A2), the data L is not detected as the existing data and is extracted as a difference, because the blocks forward of the block A3 are out of the search range. Such a case can be caused by, for example, update of the control program due to a design change (particularly, logic addition).

The search range may be set, in the common program, focusing on the blocks rearward of the block (any of A1 to Ax) corresponding to the address of the block of the control program (any of B1 to By) including the search target data. For example, the search range may be set, in the common program, so as to include the blocks forward of the block (any of A1 to Ax) corresponding to the address of the block of the control program (any of B1 to By) including the search target data and the predetermined number of blocks (for example, three blocks) contiguous to the rear of the block. In the specific example above, in the case of searching for the data L of the block B3 the search range is set, in the common program, to the block A2 that is a block forward of the block A3 corresponding to the address of the block B3 including the data L and the predetermined number of blocks contiguous to the rear of the block A2 (for example, blocks A3 to A5 when the predetermined number is three) (that is, the blocks A2 to A5 are set as the search range).

Figure 3:
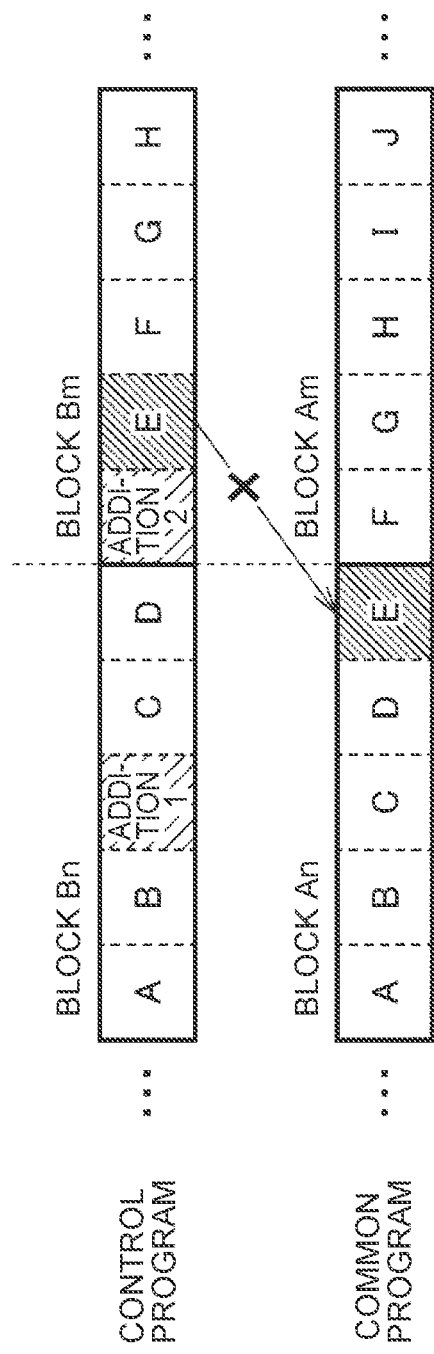
FIG. 3 is a diagram illustrating the difference extraction when a control program is updated by logic addition.

FIG. 3 is a diagram illustrating the difference extraction when the control program is updated by logic addition. As shown in FIG. 3, for example, it is assumed that first additional data and second additional data are added to the control program by update of the control program. By adding the first additional data and the second additional data, for example, data E included in a block Bn before the update is included in a block Bm after the update. On the other hand, the common program is not updated even when the control program is updated. Therefore, the data E is included in a block An corresponding to the block Bn in the common program.

The search range in the search of the data E is the block Am corresponding to the address of the block Bm including the data E and the predetermined number of blocks contiguous to the rear of the block Am. That is, in the search of the data E, the block An is not included in the search range. Therefore, the data E is not recognized as the existing data and the data E is extracted as a difference. Thus, the volume of the difference data may become large compared with the case where the data E is recognized as the existing data.

Figure 4:
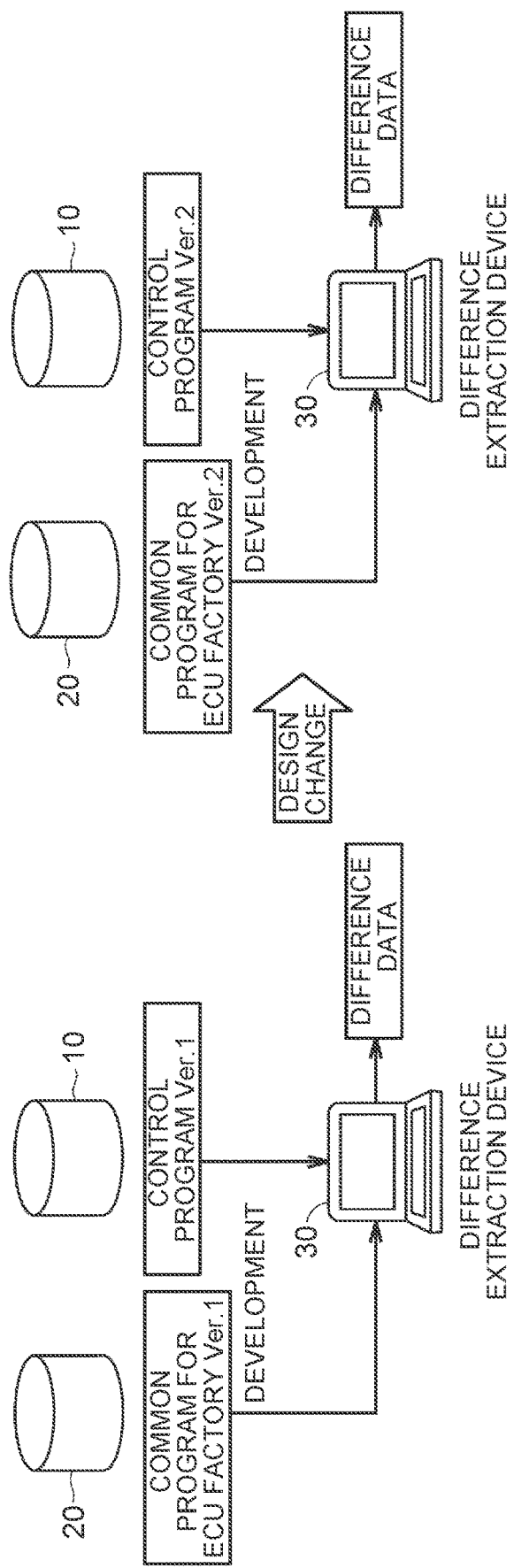
FIG. 4 is a diagram illustrating a case where a common program is developed along with the update of the control program.

As a countermeasure to the above, for example, it is conceivable to develop a new common program based on the updated control program. FIG. 4 is a diagram illustrating a case where a common program is developed along with the update of the control program.

First, it is assumed that a control program ver. 1 is developed and stored in the first server 10 as shown in FIG. 4. It is also assumed that a common program ver. 1 is developed based on the control program Ver. 1 and stored in the second server 20. In this case, the difference extraction device 30 extracts the difference between the common program ver. 1 and the control program ver. 1 and generates the difference data.

Next, it is assumed that a design change was made to the control program ver. 1 and the control program ver. 1 is updated to the control program ver. 2. In the example shown in FIG. 4, a common program ver. 2 is newly developed based on the control program ver. 2. The difference extraction device 30 extracts the difference between the common program ver. 2 and the control program ver. 2 and generates the difference data. The common program ver. 2 is newly developed so that the volume of the difference data can be made about the same as the volume of the difference data before the design change (difference data based on the difference between the common program ver. 1 and the control program ver. 1).

However, in this case, it is necessary to develop a common program every time the control program is updated. Therefore, the development cost increases. It is desired, when the control program is updated, to suppress an increase in the volume of the difference data without increasing the development cost.

Thus, in the software update system 1 according to the first embodiment, an offset area is provided in the head area of the common program. Thereby, even when the control program is updated, it is possible to suppress an increase in the volume of the difference data without newly developing a common program. That is, by providing the offset area in the head area of the common program, the common program (ver. 1) developed at the initial stage can be used even when the control program is updated. Hereinafter, a specific description will be given.

Figure 5:
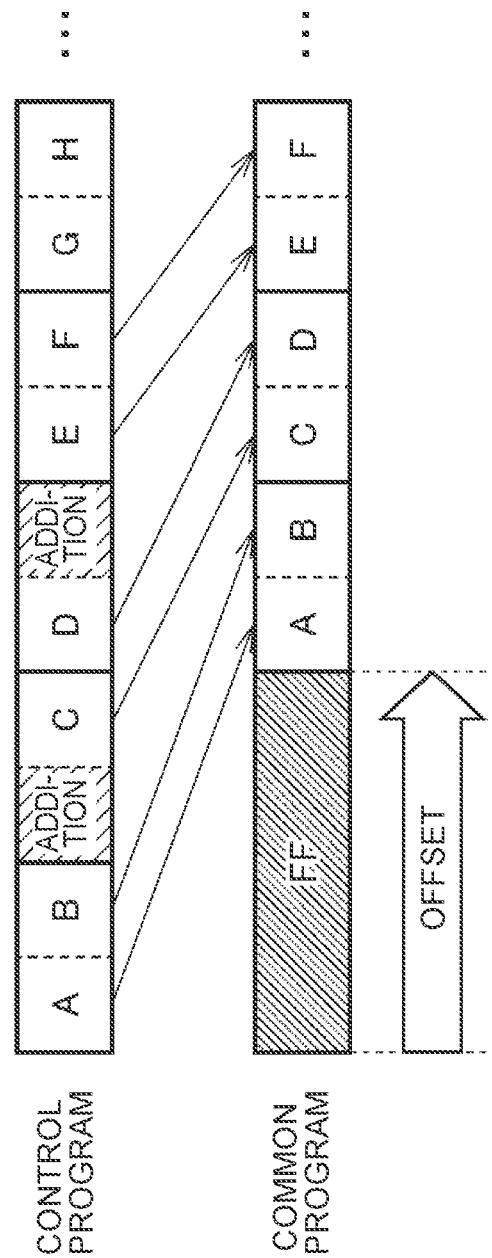
FIG. 5 is a diagram illustrating the common program according to the first embodiment.

FIG. 5 is a diagram illustrating the common program according to the first embodiment. As shown in FIG. 5, an offset area is provided in the head area of the common program. The offset area is, for example, a blank area that does not include data as the control program. Alternatively, the offset area may be an area including dummy data that does not function as the control program.

When the offset area is provided, the addresses of the corresponding data are different between the initial control program (ver. 1) and the common program (ver. 1) developed based on the initial control program. Specifically, when the offset area is provided, for example, the address of the data E in the common program becomes an address further rearward than the address of the data E in the control program. Therefore, even when the first additional data and the second additional data are added and the address of the data E in the control program is shifted rearward by the update of the control program, the block of the common program that includes the data E can be included in the search range in the search of the data E. Accordingly, the data E is recognized as the existing data and is not extracted as a difference. Thus, it is possible to suppress an increase in the difference data compared with the case where the data E is extracted as the difference.

The area (volume) for the offset area is determined based on the prediction of design changes that can be made in the development of the control program, for example. For example, the offset area is set to an area corresponding to three blocks and the like. For example, the model life of the vehicles 200 may be taken into consideration in setting the offset area.

Figure 6:
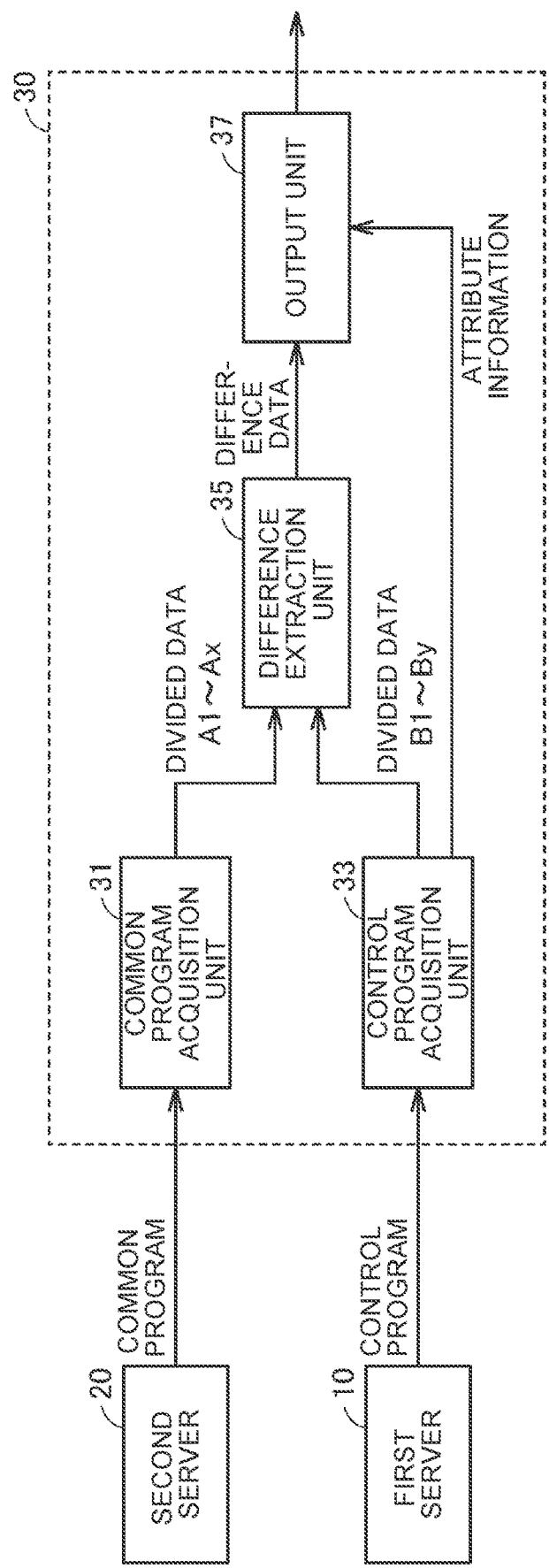
FIG. 6 is a functional block diagram illustrating a difference extraction process in a difference extraction device.

FIG. 6 is a functional block diagram illustrating the difference extraction process in the difference extraction device 30. The difference extraction device 30 includes a common program acquisition unit 31, a control program acquisition unit 33, a difference extraction unit 35, and an output unit 37.

The common program acquisition unit 31 acquires the common program from the second server 20. Specifically, the common program acquisition unit 31 collectively acquires the divided data A1 to Ax of the common program divided into blocks having the first predetermined data size from the second server 20. The common program acquisition unit 31 outputs the acquired common program to the difference extraction unit 35.

The control program acquisition unit 33 acquires the control program from the first server 10. Specifically, the control program acquisition unit 33 sequentially acquires the divided data B1 to By of the control program divided into blocks having the first predetermined data size from the first server 10. Each time the control program acquisition unit 33 receives the divided data B1 to By, the control program acquisition unit 33 outputs the received divided data B1 to By to the difference extraction unit 35.

Further, the control program acquisition unit 33 receives the attribute information associated with the control program from the first server 10. The control program acquisition unit 33 outputs the received attribute information to the output unit 37.

The difference extraction unit 35 extracts the difference between the divided data A1 to Ax and the divided data B1 to By of the control program sequentially received with reference to the divided data A1 to Ax of the common program, and generates the difference data. When the difference extraction unit 35 receives, for example, the divided data Bn of the control program, the difference extraction unit 35 performs a search by each second predetermined data size (search target data) included in the divided data Bn to find whether the search target data is included in the data A1 to Ax of the common program within the search range. When the search target data is not included in the divided data A1 to Ax within the search range, the difference extraction unit 35 extracts the search target data as a difference. When the search target data is included in the divided data A1 to Ax within the search range, the difference extraction unit 35 recognizes the search target data as the existing data and does not extract it as the difference data.

The output unit 37 receives the difference data from the difference extraction unit 35. Further, the output unit 37 receives the attribute information from the control program acquisition unit 33. The output unit 37 associates the attribute information with the difference data and outputs the difference data and the attribute information to the reprograming tool 40.

The reprograming tool 40 that has acquired the difference data and the attribute information specifies the vehicle 200 equipped with the ECU 100 that is the target for outputting the difference data (the target for writing the control program using the difference data), based on the attribute information. The reprograming tool 40 outputs the difference data to the specified vehicle 200.

Figure 7:
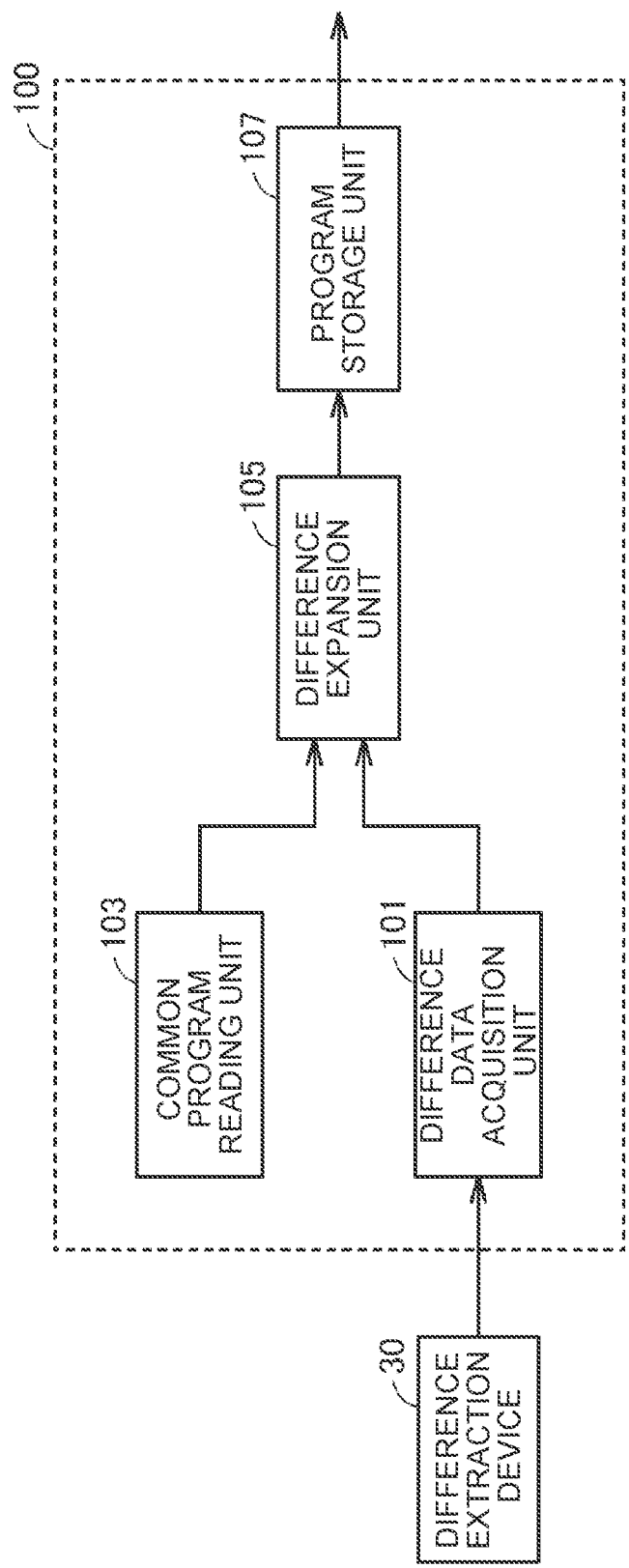
FIG. 7 is a functional block diagram (No. 1) illustrating an update process of the control program in an electronic control unit (ECU)

FIG. 7 is a functional block diagram illustrating the update process of the control program in the ECU 100. The ECU 100 includes a difference data acquisition unit 101, a common program reading unit 103, a difference expansion unit 105, and a program storage unit 107.

The difference data acquisition unit 101 acquires the difference data via the reprograming tool 40. The difference data acquisition unit 101 outputs the acquired difference data to the difference expansion unit 105.

The common program reading unit 103 reads from the memory the common program stored in the memory of the ECU 100 at the ECU factory, for example. The common program is read as the divided data A1 to Ax divided into blocks having the first predetermined data size. The common program reading unit 103 outputs the read divided data A1 to Ax to the difference expansion unit 105.

The difference expansion unit 105 decodes the difference data and restores the control program with reference to the divided data A1 to Ax. The difference expansion unit 105 outputs the restored control program to the program storage unit 107.

The program storage unit 107 stores the received control program in the memory of the ECU 100. Thus, the control program of the ECU 100 is updated (written at the first time).

Figure 8:
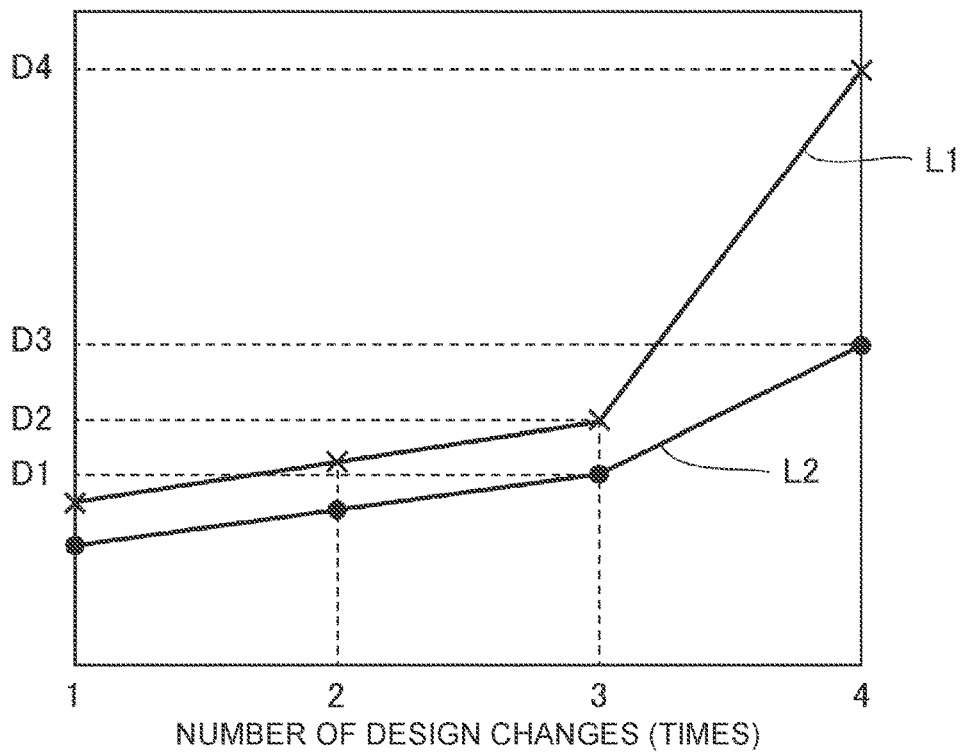
FIG. 8 is a diagram illustrating the effect of providing an offset area in the common program.

FIG. 8 is a diagram illustrating the effect of providing the offset area in the common program. FIG. 8 shows experimental data showing a relationship between the number of design changes of the control program and the volume of the difference data. In this experiment, even when the control program was updated due to a design change, the common program developed based on the initial control program was used.

The solid line L1 in FIG. 8 indicates the relationship between the number of design changes of the control program and the volume of the difference data when the offset area is not provided in the common program. The solid line L2 indicates the relationship between the number of design changes of the control program and the volume of the difference data when the offset area is provided in the head area of the common program.

For example, focusing on the third design change, the volume of the difference data when the offset area is not provided in the common program is D2, and the volume of the difference data when the offset area is provided in the head area of the common program is D1 (<D2). The difference between the volume D1 and the volume D2 is an increase due to the fact that the search target data has been excluded from the search range in the search of the search target data due to the addition of a program or the like. That is, by providing the offset area in the head area of the common program, the volume of the difference data can be reduced by D2−D1 as compared with the case where the offset area is not provided in the common program. In this experiment, the difference between the volume D1 and the volume D2 (D2−D1) corresponded to about a few percent of the volume of the control program.

Focusing on the fourth design change, when the offset area is provided in the head area of the common program, the volume increases by $\Delta Da$ (=D3−D1) from the third design change, as indicated by the solid line L2. This increase $\Delta Da$ in volume was approximately equal to the volume of the program added by the fourth design change.

On the other hand, when the offset area is not provided in the common program, the difference data markedly increases from the third to the fourth design change. Specifically, when the offset area is not provided in the common program, the volume increases by ΔDb (=D4−D2) from the third design change, as indicated by the solid line L1. This increase ΔDb in volume largely exceeded the volume of the program added by the fourth design change.

The volume difference ΔDc (=D4−D3), in the fourth design change, between the volume D3 of the difference data when the offset area is provided in the head area of the common program and the volume D4 of the difference data when the offset area is not provided in the head area of the common program corresponded to about a few percent to ten-some percent with respect to the volume of the control program. From the experimental results, it is understood that even when the number of design changes of the control program increases and the amount of program added to the control program increases, the increase in the difference data can be suppressed by providing the offset area in the head area of the common program.

As described above, in the software update system 1 according to the first embodiment, the offset area is provided in the head area of the common program. By providing the offset area in the head area of the common program, the address of the data in the common program is located further rearward than the address of the corresponding data in the control data, in the corresponding data between the initial control program and the common program developed based on the initial control program. Therefore, even when the program is added to the control program by the update of the control program, the address of the data in the common program is suppressed from being located further forward than the address of the corresponding data in the control program to such an extent that the data becomes out of the search range. Thus, it is possible to suppress data that can be recognized as existing data from being not recognized as existing data because the data is excluded from the search range and thus being extracted as a difference. Thereby, the increase in the difference data can be suppressed.

Further, in the software update system 1 according to the first embodiment, the common program that is not updated is used for generating the difference data. Therefore, in the generation of the difference data, it is possible to suppress the processing from becoming complicated as compared with the case where the comparison target with the control program is changed.

Second Embodiment

In the first embodiment, in the control program of the ECU 100, the difference between the common program that is not updated and the control program (update program) is extracted to generate the difference data, and the control program is updated using the difference data. In the second embodiment, an example will be described in which the difference between the current control program (for example, ver. 1) and the new control program in which a design change has been made (for example, ver. 2) is extracted to generate the difference data, and the control program is updated using the difference data.

Figure 9:
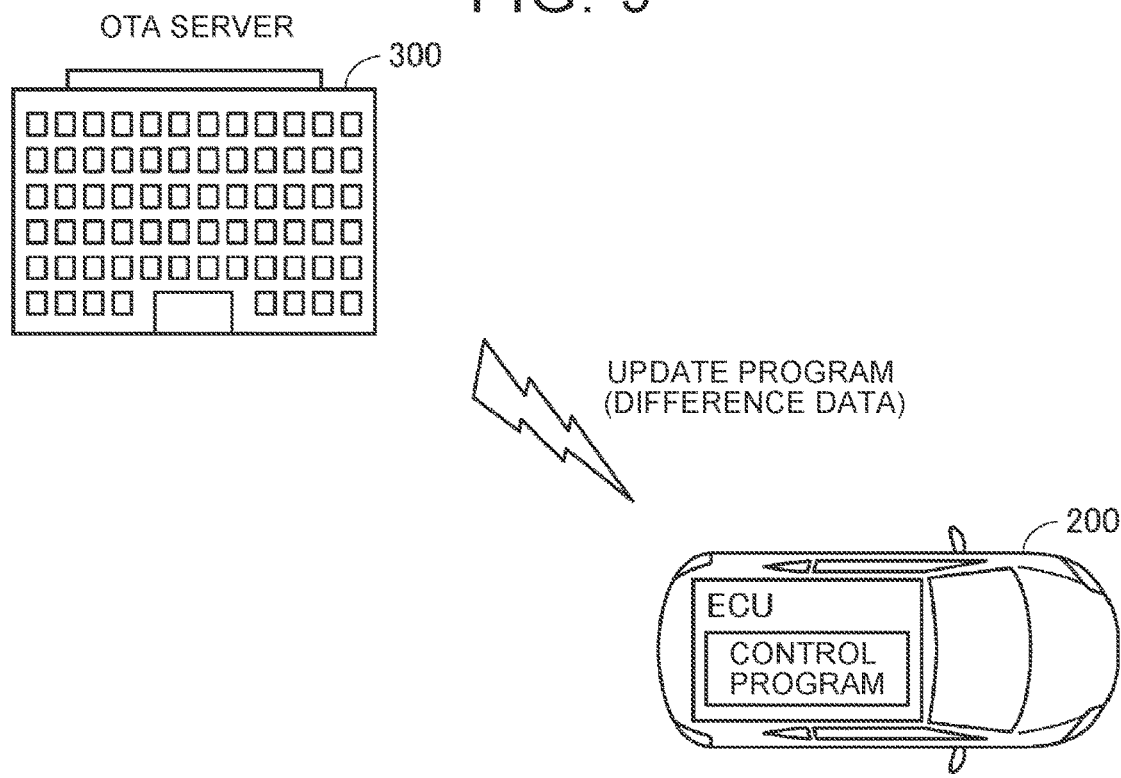
FIG. 9 is a diagram illustrating the update of the control program according to a second embodiment.

FIG. 9 is a diagram illustrating the update of the control program according to the second embodiment. In the second embodiment, a case where the control program of the vehicle 200 (ECU 100) distributed in the market is updated by so-called over-the-air (OTA) will be described as an example.

When an update program for the control program of the vehicle 200 is developed, an OTA server 300 distributes the update program to the vehicle 200 via a communication network such as the Internet.

The OTA server 300 stores the current control program of the ECU 100. When the design change is made in the control program and the control program is updated (developed), the OTA server 300 stores the updated control program (update program) in addition to the current control program. Then, the OTA server 300 extracts the difference between the current control program (for example, control program ver. 1) and the update program (for example, control program ver. 2) to generate the difference data. The OTA server 300 outputs the difference data to the vehicle 200 equipped with the ECU 100 to which the update program is applied. Then, when the update of the control program of the ECU 100 is completed, the OTA server 300 overwrites the current control program (control program ver. 1) with the update program (control program ver. 2) and stores the update program (control program ver. 2) as the current control program.

Figure 10:
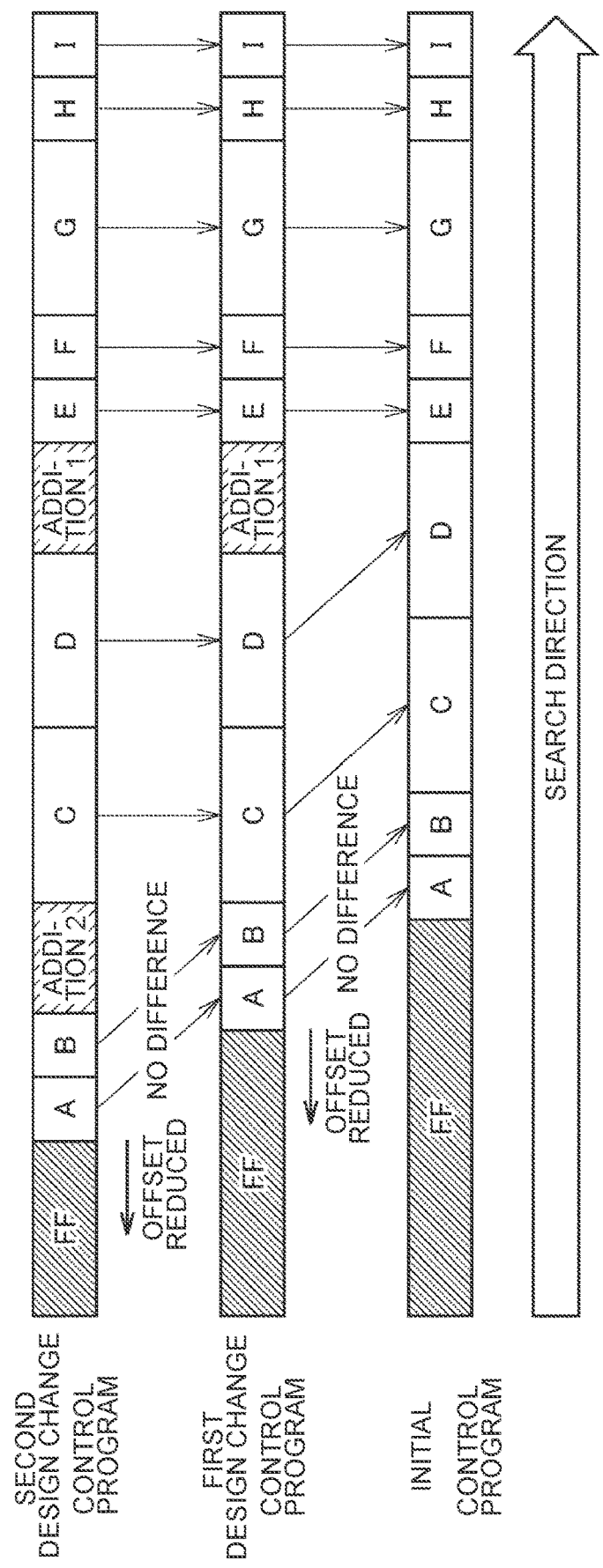
FIG. 10 is a diagram illustrating a data structure of the control program according to the second embodiment.

FIG. 10 is a diagram illustrating the data structure of the control program according to the second embodiment. FIG. 10 shows (a) the data structure of the initial control program, (b) the data structure of the control program in which the first design change has been made (the first update has been performed), and (c) the data structure of the control program in which the second design change has been made. The initial control program according to the second embodiment is, for example, a control program implemented in the ECU 100 of the vehicle 200 at the time of shipment from the factory.

An offset area is provided in the head area of the initial control program as in the first embodiment. As for the offset area in the second embodiment, the area (volume) is determined, for example, based on the prediction of the design changes, as in the first embodiment.

For example, it is assumed that the first additional data is added to the control program in the first design change. More specifically, it is assumed that the first additional data is added between the data D and the data E. In this case, the first additional data is added to the control program so as to reduce the offset area. More specifically, as shown in FIG. 10, the first additional data is added to the area forward of the data E without changing the address of the data E. Thereby, the addresses of the data A to D are moved to the forward addresses, and the offset area is reduced.

With the configuration in which the first additional data is added in this way, when searching for the difference between the initial control program and the control program in which the first design change has been made, it is possible to appropriately search the data A to D located in the area forward of the first additional data that has been added while appropriately searching the data E to I located in the area rearward of the first additional data.

Specifically, for example, focusing on the data A, the address of the data A in the control program in which the first design change has been made becomes an address located forward of the address of the data A in the initial control program. Therefore, the search range of the data A includes the data A in the initial program. Thus, by searching of the data A, the data A is recognized as the existing data, and the data A is determined as "no difference".

Further, for example, focusing on the data E, the address of the data E in the control program in which the first design change has been made is the same as that of the data E in the initial control program. Therefore, the search range of the data E includes the data E in the initial program. Thus, by searching of the data E, the data E is recognized as the existing data, and the data E is determined as "no difference".

If the offset area is not provided in the head area of the control program, the addresses of the data E to I in the control program in which the first design change has been made are respectively located further rearward than the data E to I in the initial control program, due to the addition of the first additional data. Therefore, for example, when searching for the data E, the search range of the data E may not include the data E in the initial program, and the data E may be extracted as a difference. Then, the volume of the difference data increases, leading to increase in traffic of the communication line and increase in update time of the control program. By providing the offset area in the head area of the control program, it is possible to suppress an increase in the volume of the difference data as compared with the case where the offset area is not provided in the head area of the control program, and accordingly, it is possible to reduce the traffic of the communication line and shorten the update time of the control program.

Further, even when the second additional data is added between the data B and the data C in the second design change, the second additional data is added, in the control program, so as to reduce the offset area as in the case of the first design change. That is, the second additional data is added to the area forward of the data C without changing the address of the data C. Thereby, the addresses of the data A and B are moved to the forward addresses, and the offset area is reduced.

Figure 11:
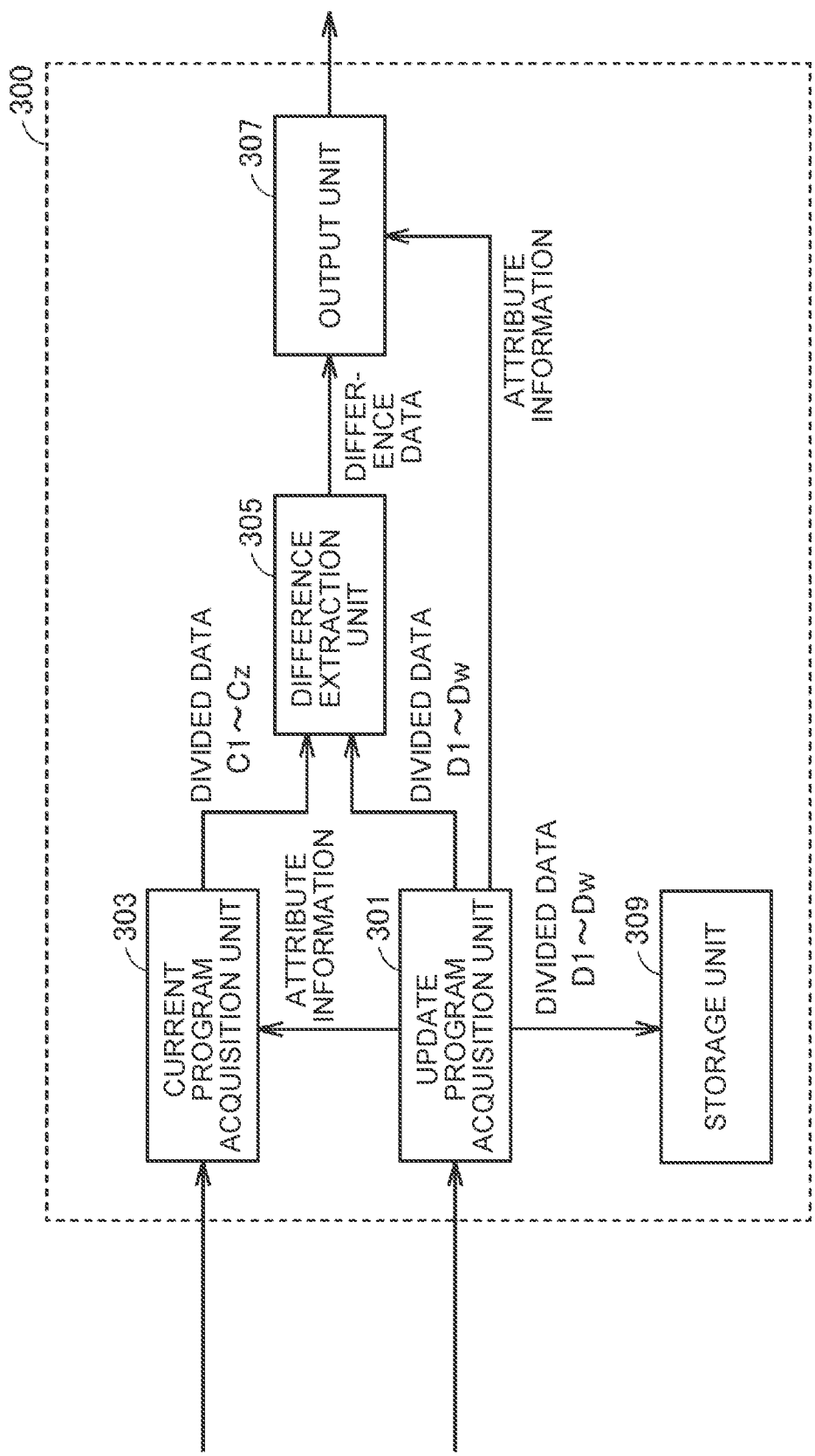
FIG. 11 is a functional block diagram illustrating a difference extraction process of an over-the-air (OTA) server.

FIG. 11 is a functional block diagram illustrating a difference extraction process of the OTA server 300. The OTA server 300 includes an update program acquisition unit 301, a current program acquisition unit 303, a difference extraction unit 305, an output unit 307, and a storage unit 309.

The update program acquisition unit 301 acquires the updated control program (update program) from the server in which the update program is stored. The update program is also divided into blocks having the first predetermined data size, similarly to the control program described in the first embodiment. The update program acquisition unit 301 sequentially acquires from the server the divided data D1 to Dw (w: natural number) of the update program divided into blocks having the first predetermined data size. Each time the update program acquisition unit 301 acquires the divided data D1 to Dw, the update program acquisition unit 301 outputs the acquired divided data D1 to Dw to the difference extraction unit 305 and the storage unit 309.

Further, the update program acquisition unit 301 acquires the attribute information associated with the control program from the server. The update program acquisition unit 301 outputs the acquired attribute information to the current program acquisition unit 303 and the output unit 307.

The current program acquisition unit 303 specifies the ECU to which the update program is applied based on the attribute information. The current program acquisition unit 303 specifies, for example, the ECU 100 of the vehicle 200 as the application target of the update program. The current program acquisition unit 303 acquires the control program (current control program) currently implemented in the ECU 100 of the vehicle 200 from, for example, a storage device (not shown). The control program is also divided into blocks having the first predetermined data size, similarly to the control program described in the first embodiment. The current program acquisition unit 303 collectively acquires the divided data C1 to Cz (z: natural number) of the current program divided into blocks having the first predetermined data size from the storage device. The current program acquisition unit 303 outputs the acquired current program to the difference extraction unit 305. When the current control program is stored in a server (not shown) outside the OTA server 300, the current program acquisition unit 303 may be configured to acquire the current program from the server in which the current control program is stored.

The difference extraction unit 305 extracts the difference between the divided data C1 to Cz and the divided data D1 to Dw of the update program sequentially received with reference to the divided data C1 to Cz of the current program and generates the difference data. The difference extraction unit 305 outputs the generated difference data to the output unit 307.

The output unit 307 receives the difference data from the difference extraction unit 305. Further, the output unit 307 receives the attribute information from the update program acquisition unit 301. The output unit 307 transmits the difference data to the vehicle 200 equipped with the ECU 100 specified by the attribute information.

The storage unit 309 stores the update program acquired by the update program acquisition unit 301 in the storage device as the current program.

Figure 12:
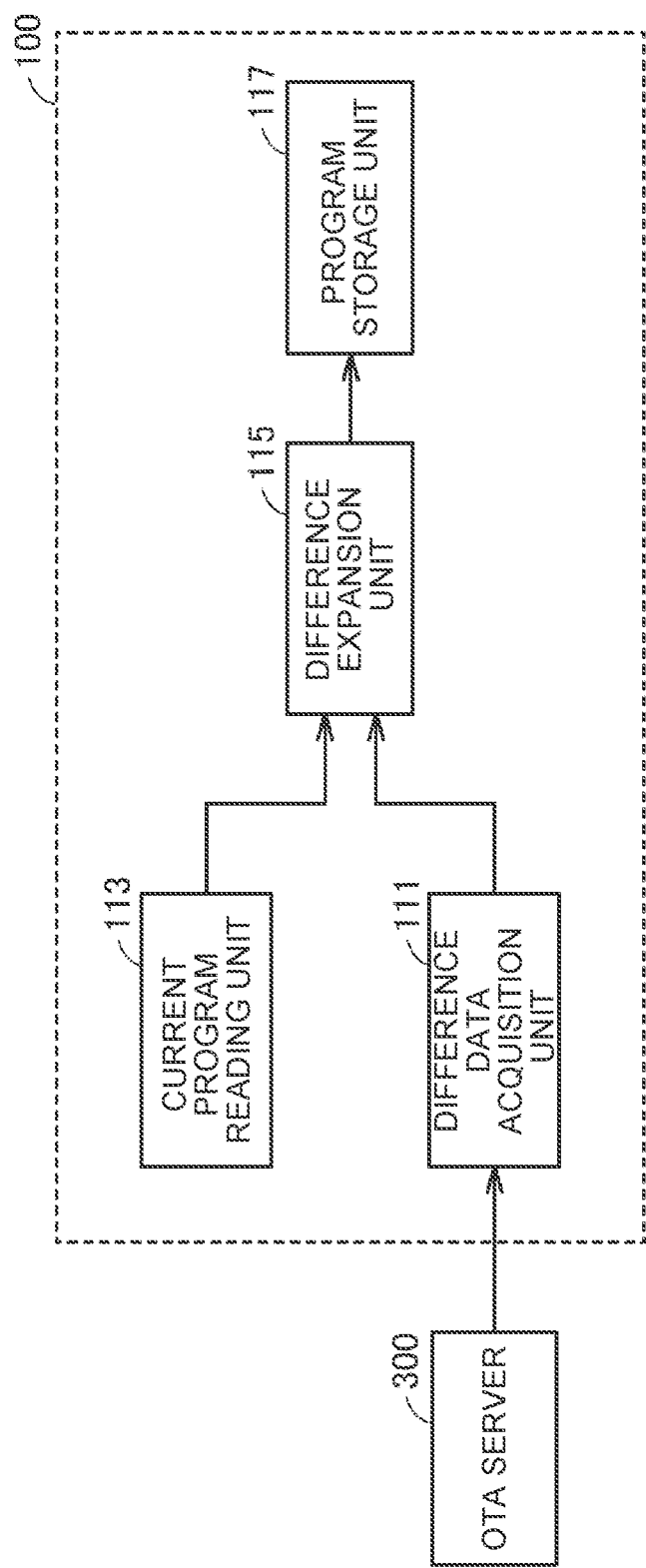
FIG. 12 is a functional block diagram (No. 2) illustrating the update process of the control program in the ECU.

FIG. 12 is a functional block diagram illustrating the update process of the control program in the ECU 100. The ECU 100 includes a difference data acquisition unit 111, a current program reading unit 113, a difference expansion unit 115, and a program storage unit 117.

The difference data acquisition unit 111 acquires the difference data from the OTA server 300. The difference data acquisition unit 111 outputs the acquired difference data to the difference expansion unit 115.

The current program reading unit 113 reads the current control program from the memory. The current control program is read as the divided data divided into blocks having the first predetermined data size. The current program reading unit 113 outputs the read divided data to the difference expansion unit 115.

The difference expansion unit 115 decodes the difference data and restores the control program (update program) with reference to the divided data of the current control program. The difference expansion unit 115 outputs the restored control program to the program storage unit 117.

The program storage unit 117 stores the control program received from the difference expansion unit 115 in the memory of the ECU 100 as the current control program. Thus, the control program of the ECU 100 is updated.

As described above, in the second embodiment, the offset area is provided in the head area of the control program. Then, when the program is added to the control program, the program is added so as to reduce the offset area. By adding the program in this way, it is possible to suppress a phenomenon that due to the addition of the program, the address of the data in the control program before the update is located further forward than the address of the corresponding data of the control program after the update, in the corresponding data between the data in the control program before the update and the data in the control program after the update. Therefore, even when the program is added to the control program by the update of the control program, it is possible to suppress the search target data from being excluded from the search range. Thus, it is possible to suppress data that can be recognized as existing data from being not recognized as existing data because the data is excluded from the search range and thus being extracted as a difference. Thereby, the increase in the difference data can be suppressed.

Further, in the second embodiment, the difference between the current control program (for example, ver. 1) and the new control program (for example, ver. 2) in which a design change has been made is extracted to generate the difference data. That is, the difference data is generated by extracting the difference between the new control program and the control program of a version immediately before the new control program. Since it is a comparison with the control program of the previous version, the volume of the difference data can be made small compared with the case where the difference data is generated by extracting the difference between the initial control program and the new control program, for example.

The embodiments disclosed herein should be considered as exemplary in all respects and not restrictive. The scope of the present disclosure is indicated by the claims rather than the description of the embodiments above, and is intended to include all modifications within the meaning and scope equivalent to the scope of the claims.

What is claimed is:

1. A program update method that transmits difference data between a first program and a second program from a first device to a second device and updates a control program implemented in the second device to the second program based on the difference data, the program update method comprising:
   in the first device,
      acquiring the first program, the first program being divided into a plurality of first data blocks;
      acquiring the second program, the second program being divided into a plurality of second data blocks;
      searching a search range of the first data blocks to find whether search target data of the second program divided into search units is included in the first program;
      not extracting the search target data as a difference when the search target data is included in the first program;
      extracting the search target data as the difference to generate difference data when the search target data is not included in the first program; and
      outputting the generated difference data to the second device, and in the second device,
      updating the control program to the second program based on the difference data, the control program being executable by the second device, wherein:
   the search range of the first data blocks is set, in the first program, so as to (1) include a total number of the first data blocks less than the plurality of first data blocks and (2) include a first number of the first data bocks located at addresses rearward of an address that is the same as an address of one of the second data blocks including the search target data of the second program that is greater than a second number of the first data blocks located at addresses forward of the address that is the same as the address of the one of the second data blocks including the search target data of the second program; and
   an offset area that does not include data as a program is provided in a head area of the first program.

2. The program update method according to claim 1, wherein
   the first program is a program implemented in the second device for updating the control program, and
   the first program is a program that is not updated.

3. The program update method according to claim 1, wherein:
   the control program is the first program; and
   the first program is a program of a version immediately before the second program.

4. The program update method according to claim 3, wherein when an update from the first program to the second program includes an addition of data, the data is added so as to reduce the offset area in the second program.

5. The program update method according to claim 1, wherein:
   each of the first data blocks and the second data blocks have a predetermined data size;
   a volume of the data blocks is larger than the search units; and
   the search range is set, in the first program, so as to include one of the first data blocks located at the address that is the same as the address of the one of the second data blocks including the search target data of the second program and at least one of the first data blocks located at the addresses rearward of the one of the first data blocks located at the address that is the same as the address of the one of the second data blocks including the search target data of the second program.

6. The program update method according to claim 1, wherein a volume of the offset area is set based on prediction of a potential design change to the control program implemented in the second device.

7. An update system that transmits difference data between a first program and a second program to a device to be updated and updates a control program implemented in the device to be updated to the second program based on the difference data, the update system comprising:
   the device to be updated;
   a first storage device that stores the first program, the first program being divided into a plurality of first data blocks;
   a second storage device that stores the second program, the second program being divided into a plurality of second data blocks; and
   a difference extraction device that generates the difference data and transmits the difference data to the device to be updated, wherein:
      the difference extraction device
         acquires the first program and the second program from the first storage device and the second storage device, respectively,
         searches a search range of the first data blocks by a search unit to find whether search target data of the second program is included in the first program,
         does not extract the search target data as a difference when the search target data is included in the first program, and
         extracts the search target data as the difference to generate difference data when the search target data is not included in the first program;
      the device to be updated includes at least one processor configured to update the control program implemented in the device to be updated to the second program based on the difference data, the control program being executable by the at least one processor;

the search range of the first data blocks is set, in the first program, so as to (1) include a total number of the first data blocks less than the plurality of first data blocks and (2) include a first number of the first data bocks located at addresses rearward of an address that is the same as an address of one of the second data blocks including the search target data of the second program that is greater than a second number of the first data blocks located at addresses forward of the address that is the same as the address of the one of the second data blocks including the search target data of the second program; and an offset area that does not include data as a program is provided in a head area of the first program.

* * * * *